(12) United States Patent
Shimizu

(10) Patent No.: US 6,614,539 B1
(45) Date of Patent: Sep. 2, 2003

(54) TELECENTRIC OPTICAL SYSTEM

(75) Inventor: Yoshie Shimizu, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/562,803

(22) Filed: May 2, 2000

(30) Foreign Application Priority Data

May 11, 1999 (JP) .......................................... 11-129548

(51) Int. Cl.[7] .............................................. G01N 11/24
(52) U.S. Cl. ...................................... 356/609; 359/663
(58) Field of Search ............................. 356/609, 624; 359/663

(56) References Cited

U.S. PATENT DOCUMENTS

| | | | | |
|---|---|---|---|---|
| 4,249,805 A | * | 2/1981 | Hilbert et al. ............... | 359/663 |
| 4,592,625 A | | 6/1986 | Uehara et al. | |
| 4,629,324 A | * | 12/1986 | Stern ........................... | 356/609 |
| 4,730,927 A | * | 3/1988 | Ototake et al. .............. | 356/609 |
| 5,033,856 A | * | 7/1991 | Nose et al. .................. | 356/609 |
| 6,313,915 B1 | * | 11/2001 | Yanagisawa et al. ........ | 356/614 |

FOREIGN PATENT DOCUMENTS

| | | |
|---|---|---|
| JP | 5-75607 | 10/1993 |
| JP | 9-126739 | 5/1997 |

* cited by examiner

Primary Examiner—Richard A. Rosenberger
(74) Attorney, Agent, or Firm—Burns, Doane, Swecker & Mathis, LLP

(57) ABSTRACT

A bilaterally conjugate telecentric optical system has, sequentially from one conjugate side, a first lens unit in the form of an afocal optical system including sequentially from one conjugate side a first subunit having positive optical power and a second subunit having positive optical power, and having an aperture stop fixed in the optical axis direction at the focal position on the back side of the first subunit; and a second lens unit in the form of an afocal optical system that is movable in the optical axis direction to adjust the focus while maintaining a telecentric state.

15 Claims, 8 Drawing Sheets

TELECENTRIC OPTICAL SYSTEM

This application is based on Patent Application No. 11-129548 filed in Japan, the content of which is hereby incorporated by reference.

BACKGROUND OF THE INVENTION

1. Field of the Invention

The present invention relates to a telecentric optical system, and further relates, for example, to a three-dimensional measuring device using a telecentric optical system as a projection optical system (e.g. an object lens used for shape/dimension measuring) when a constant magnification is required even when the working distance (distance from an object to the outermost lens on the object side) and back focal length (distance from the outermost lens surface on the image side to the image plane) change.

2. Description of the Related Art

The confocal detection method is known as one type of method used for three-dimensional shape measurement. The pin-hole method and the slit method are among the confocal detection methods. The pin-hole method uses an illumination pin-hole for emitting light to illuminate an object, and a detection pin-hole for directing the light reflected from the illuminated object to a sensor. The illumination light emitted from the illumination pin-hole passes through a beam splitter and optical system and illuminates the object. Then after the light reflected from the object passes through the optical system, the light is reflected by the beam splitter and enters the detection pin-hole. The illumination pin-hole and the detection pin-hole are arranged at conjugate positions (i.e., optically equivalent positions in an objective optical system), such that when these pin-holes are together at conjugate positions (focal position) relative to both objects, a maximum amount of light passes through the detection pin-hole. If the working distance from this state changes, the amount of light passing through the detection pin-hole is markedly reduced. Accordingly, the object dimension (height) can be detected with great accuracy in a direction parallel to the optical axis.

Since height information can only be obtained for one point at a time in the pin-hole method, when actually measuring the three-dimensional shape of an object, the state of the conjugate position relationship of the pin-hole and object must be detected at each point, and a two-dimensional scan within a plane perpendicular to the optical axis of the optical system or object must be performed while obtaining each height information. The slit method eliminates this disadvantage. Since the scan is unidimensional in the slit method, the object height measurement accuracy can be sufficient while reducing the scan mechanism since height information is obtained at many points at once using this method. However, in realizing the slit method, the system normally must be telecentric on both the object side and image side within a range providing adequate image height for projection of the length of the slit, i.e., the optical system must satisfy the required specifications.

Since the object dimension is detected in a direction parallel to the optical axis in the confocal detection method, generally, the scan method used is either a scan method which moves the measured object (i.e., the subject of the measurement) in the optical axis direction, or a scan method which moves the optical system in the optical axis direction. In the case of the former scan method, the measurement object is restricted due to the increase in the load on the scanning system due to the size and weight of the measurement object. Moreover, the measurement object must be completely stationary to achieve precise measurement.

In the case of the latter scan method, the object image normally must be projected on the image plane at the same magnification even if the conjugate distance (i.e., distance from the object to the image) changes at the image height position. Therefore, the optical system normally must have telecentric characteristics on both the object side and image side even when the conjugate distance changes. When using a method which detects the focus state by moving the entire dual-conjugate optical system in the optical axis direction, the moving members become larger, and the load increases on the scanning mechanism. Accordingly, in devices constructed as described above, the moving lens unit must be rendered as small and light weight as possible.

U.S. Pat. No. 4,592,625 discloses an optical system that normally has telecentric characteristics on both the object side and image side even when the conjugate distance changes. This optical system comprises an afocal system of a plurality of lens units, and two positive lens units arranged on both sides thereof on the same axis. One positive lens unit and the afocal system are constructed so as to be independently movable, such that when the conjugate distance changes the working distance and the back focal length are maintained normally constant by moving the positive lens unit and the afocal system in a predetermined relationship thereby maintaining the conjugate relationship of the two units.

In the optical system disclosed in U.S. Pat. No. 4,592,625, the two lens units of one positive lens unit and the afocal system must be moved. Two methods are considered to move the two lens units: a method of independently moving each lens unit using two drive systems, and a method for moving the two lens units using a single drive system linking the two lens units via a cam or the like. Using either method, however, makes the device complex, and the optical system does not meet its purpose in repeatedly changing the conjugate distance at high speed with high accuracy. Since this optical system is constructed so as to change the overall length of the optical system while normally maintaining a constant working distance and back focal length, it cannot be used in systems to change the working distance and back focal length.

SUMMARY OF THE INVENTION

An object of the present invention is to provide an improved telecentric optical system.

A further object of the present invention is to provide a telecentric optical system capable of focusing while maintaining telecentric characteristics on both the object side and the image side by moving one lens unit even when the conjugate distance changes.

A still further object of the present invention is to provide a three-dimensional shape measuring device capable of excellent measurement even when the working distance and back focal length change.

These objects are attained by a telecentric optical system comprising sequentially from one conjugate side:
a first lens unit in the form of an afocal optical system including sequentially from one conjugate side a first subunit having positive optical power and a second subunit having positive optical power, and having a stop fixed in the optical axis direction at the focal position on the back side of the first subunit, and a second lens unit in the form of an afocal optical system that is movable in the optical axis direction to adjust the focus while maintaining a telecentric state.

BRIEF DESCRIPTION OF THE DRAWINGS

These and other objects and features of this invention will become clear from the following description taken in conjunction with the preferred embodiments with reference to the accompanying drawing, in which.

DETAILED DESCRIPTION OF THE PREFERRED EMBODIMENTS

The three-dimensional shape measuring device and telecentric optical system of the present invention are described hereinafter with reference to the accompanying drawings. Thin lenses are considered in relation to the optical system for simplicity.

Figure 5:
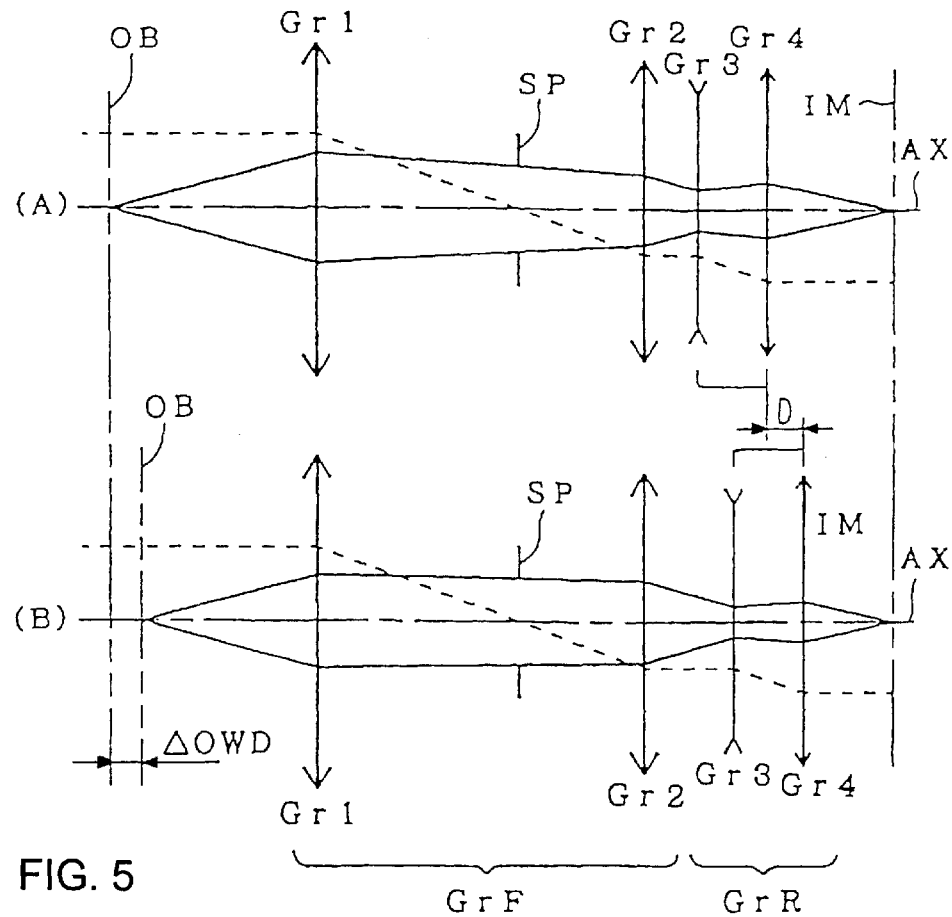
FIG. 5 schematically shows the optical structure of a telecentric optical system having a Galilean (negative-positive) moving lens unit.

FIG. 5 shows an embodiment of the telecentric optical system. This telecentric optical system comprises sequentially from the object side a fixed lens unit (GrF) in the form of an afocal optical system, and a moving lens unit (GrR) in the form of an afocal optical system, and has a telecentric structure on both the object side and the image side. In the drawing, OB refers to the object plane, IM refers to the image plane, and AX refers to the optical axis. The fixed lens unit (GrF) has a first subunit (Gr1) of positive optical power, and a second subunit (Gr2) of positive optical power, and an aperture stop (SP) at the focal position behind the first subunit (Gr1). The moving lens unit (GrR) has a third subunit (Gr3) of negative optical power, and a fourth subunit (Gr4) of positive optical power, and satisfies conditional equation (i) below. The moving lens unit (GrR) is constructed so as to be movable as a focus lens unit in order to focus relative to different object distances while maintaining a telecentric state.

$$f3 \neq -f4 \qquad (i)$$

In conditional equation (i), f3 represents the focal length of the third subunit (Gr3), and f4 represents the focal length of the fourth subunit (Gr4).

Figure 1:
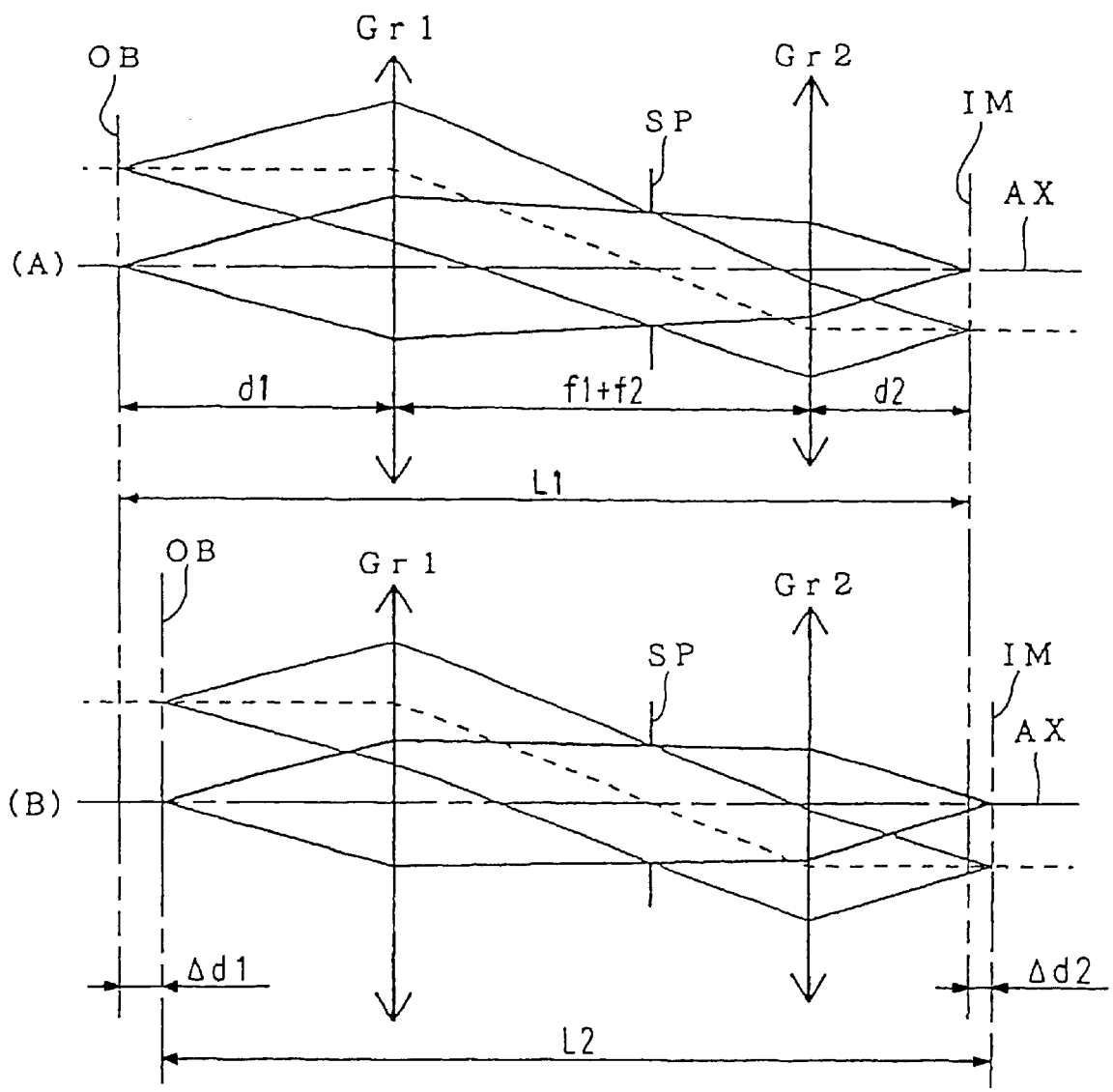
FIG. 1 schematically shows the optical structure of the fixed lens unit of the telecentric optical system.

The various functions of the fixed lens unit (GrF) and the moving lens unit (GrR) are described below. First, the fixed lens unit (GrF) can be considered when using a Keplerian afocal optical system as a dual-telecentric optical system, as shown in FIG. 1(A). In this fixed lens unit (GrF), the distance between the two subunits (Gr1 and Gr2) is f1+f2, when $\beta F$ represents the magnification of the fixed lens unit (GrF), f1 represents the focal length of the first subunit (Gr1), f2 represents the focal length of the second subunit (Gr2), d1 represents the distance from the object plane to the first subunit (Gr1), and d2 represents the distance from the second subunit (Gr2) to the image forming plane (IM).

When the object (OB) moves a distance $\Delta d1$ to the first subunit (Gr1) side in moving from the state of FIG. 1(A) to the state of FIG. 1(B), the distance from the second subunit (Gr2) to the image forming plane (IM) changes only $\Delta d2$. That is, $\Delta d1$ represents the change in distance d1 from the object plane (OB) to the first subunit (Gr1), and $\Delta d2$ represents the change in distance d2 from the second subunit (Gr2) to the image forming plane (IM). At this time, equation (E1) can be derived from the relationship of vertical magnification.

$$\Delta d2 = \beta F^2 \times \Delta d1 \qquad (E1)$$

When L1 represents the conjugate distance in the state shown in FIG. 1(A), L2 represents the conjugate distance in the state shown in FIG. 1(B), and $\Delta L$ represents the change in the conjugate length. Since the distance between the two subunits (Gr1 and Gr2) is f1+f2, the conjugate distance L1 can be expressed by equation (E2), the conjugate distance L2 can be expressed by equation (E3) derived from equation (E1), and the change DL1 can be expressed by equation (E4) derived from equations (E2) and (E3). As can be understood from equation (E4), the conjugate distance does not change ($\Delta L=0$) only when $\beta F=1$. In other words, when the lens is not at equal magnification, the conjugate distance also changes when the distance d1 or distance d2 changes. The relationship between $\Delta d2$ and $\Delta L$ can be derived from equations (E1) and (E4) and expressed by equation (E5) below.

$$L1 = d1 + f1 + f2 + d2 \qquad (E2)$$

$$L2 = L1 - \Delta d1 + \Delta d2 = L1 - \Delta d1(1 - \beta F^2) \qquad (E3)$$

$$\Delta L = L1 - L2 = L1 - \{L1 - \Delta d1(1 - \beta F^2)\} = \Delta d1(1 - \beta F^2) \qquad (E4)$$

$$\Delta d2 = \{\beta F^2 / (1 - \beta F^2)\} \times \Delta L \qquad (E5)$$

Similar to the fixed lens unit (GrF), the moving lens unit (GrR) can be considered when a Keplerian afocal optical system is used as a dual telecentric optical system, as shown in FIG. 2(A). In this moving lens unit (GrR), the distance between the two subunits (Gr3 and Gr4) is f3+f4, when $\Delta R$ represents the magnification of the moving lens unit (GrR), f3 represents the focal length of the third subunit (Gr3), f4 represents the focal length of the fourth subunit (Gr4), d3 represents the distance from the object plane to the third subunit (Gr3), and d4 represents the distance from the fourth subunit (Gr4) to the image forming plane (IM).

When the moving lens unit (GrR) moves a distance D to the object (OB) side, the object (OB) formed on the image plane (IM) moves only $\Delta d3$ to the first subunit (Gr1) side. That is, $\Delta d3$ represents the change in distance d3 from the object plane (OB) to the third subunit (Gr3) (i.e., the change in the conjugate distance), and D represents the change in distance d4 from the fourth subunit (Gr4) to the image forming plane (IM) (i.e., the amount of movement of the moving lens unit (GrR)).

As can be understood from FIGS. 2(A) and 2(B), the dual telecentric optical system can be used as a focus lens unit when projecting an object (OB) at different conjugate distances insofar as the magnification is not 1:1. That is, such usage is possible if the aforesaid conditional equation (i) is such that f3≠−f4. Furthermore, since the change Δd2 and ΔL in the fixed lens unit (GrF) respectively corresponds to D and Δd3 in the moving lens unit (GrR), the relationship expressed by equation (E6) below is obtained from the aforesaid equation (E5). From equation (E6) it can be understood that the amount of focus movement D is dependent only on the magnification PR of the moving lens unit (GrR).

$$D=\{\beta R^2/(1-\beta R^2)\}\times\Delta d3 \tag{E6}$$

Figure 2:
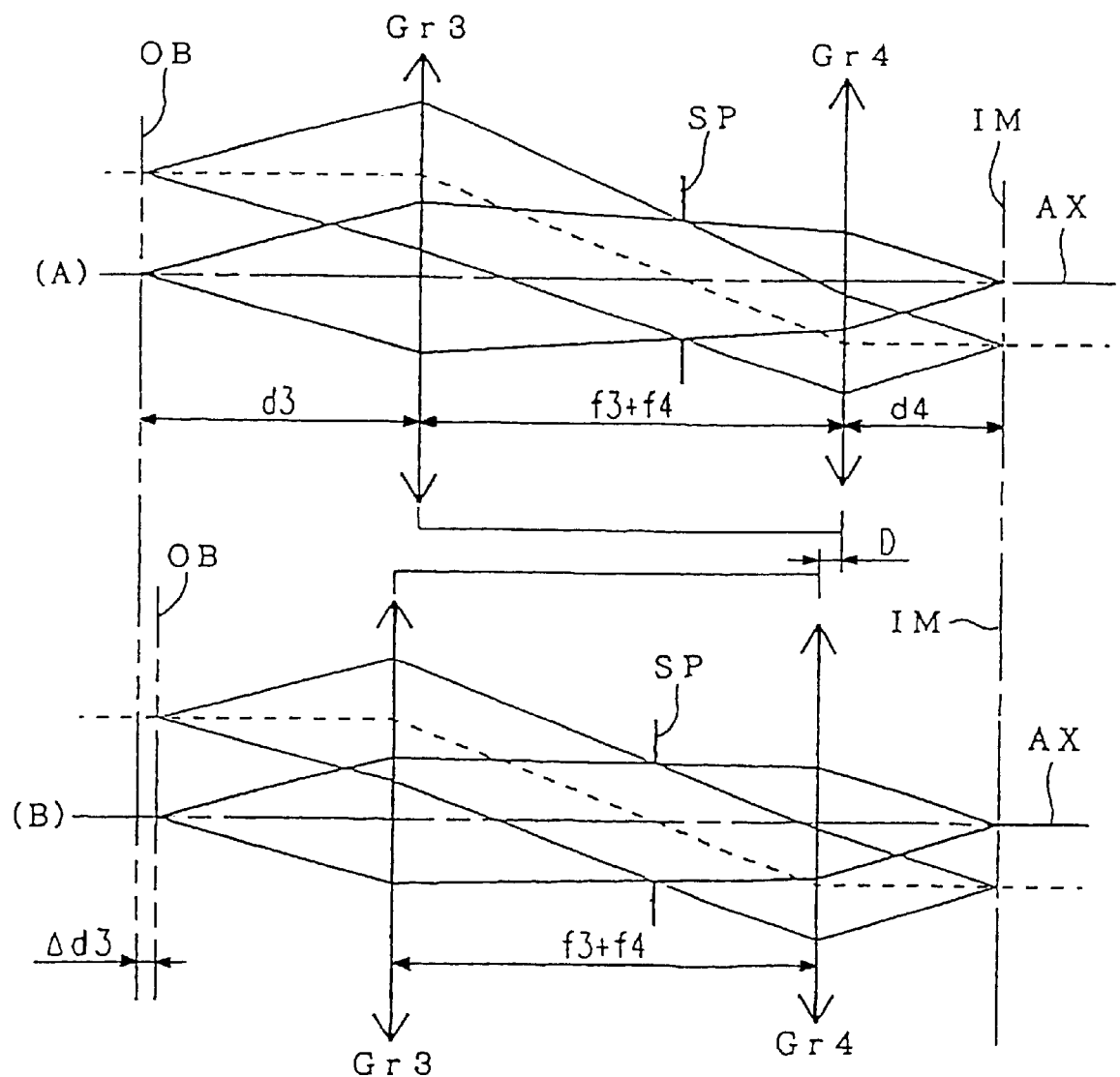
FIG. 2 schematically shows the optical structure of a Keplerian (positive-positive) moving lens unit of the telecentric optical system.
Figure 3:
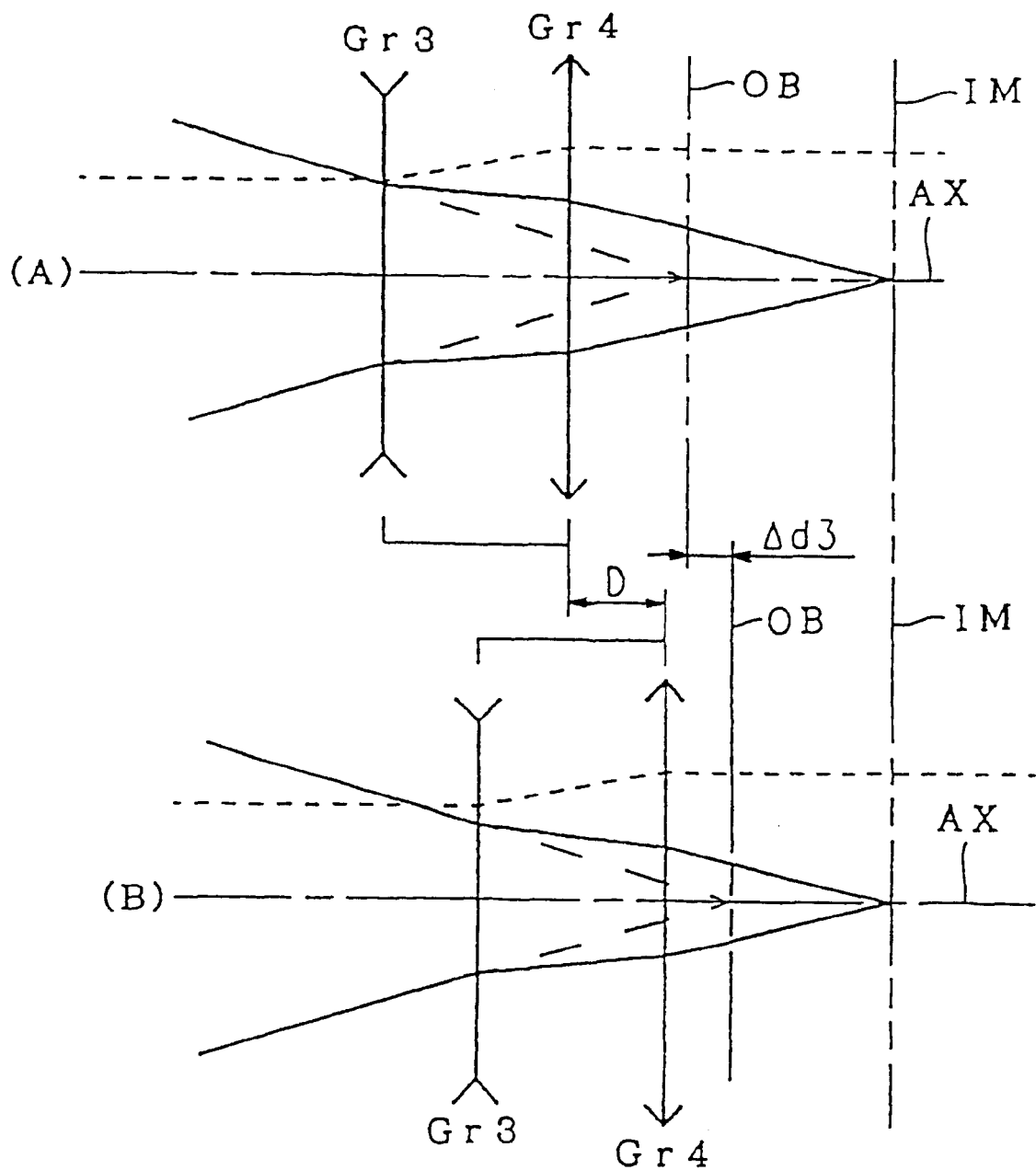
FIG. 3 schematically shows the optical structure of a Galilean (negative-positive) moving lens unit of the telecentric optical system.
Figure 4:
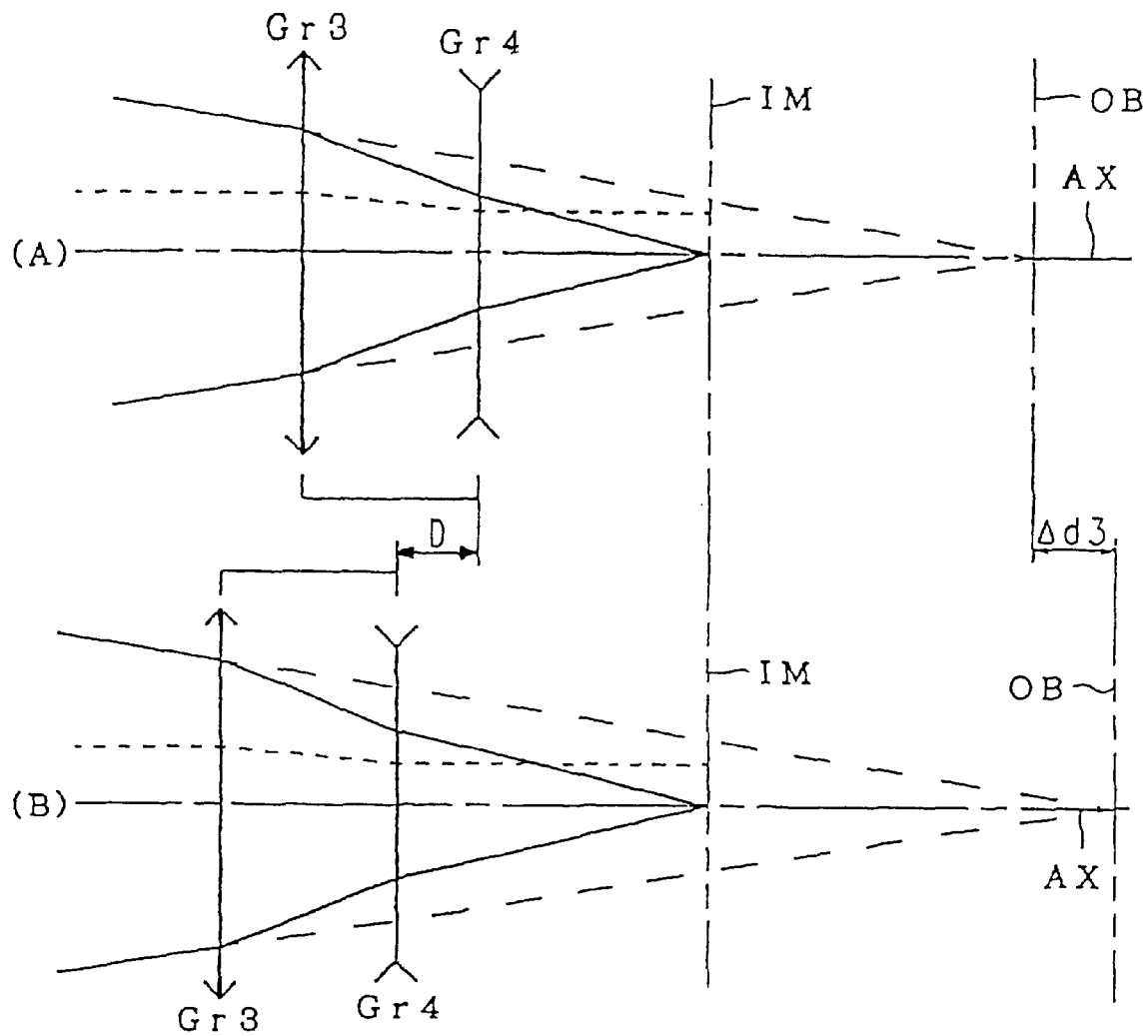
FIG. 4 schematically shows the optical structure of a Galilean (positive-negative) moving lens unit of the telecentric optical system.
Figure 6:
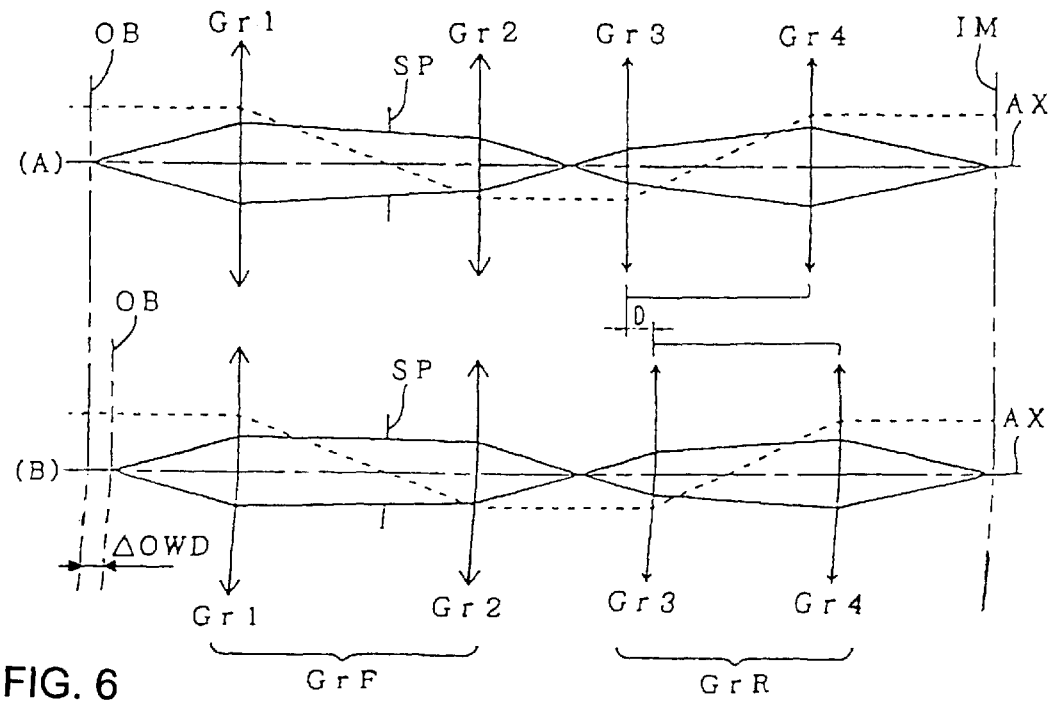
FIG. 6 schematically shows the optical structure of a telecentric optical system having a Keplerian (positive-positive) moving lens unit.

In a dual concentric optical system used as a focus lens unit as in the case of the moving lens (GrR), the lens unit need not necessarily be a Keplerian lens unit as shown in FIG. 2 since the aperture stop (SP) need not be positioned within the lens unit. A negative-positive (FIG. 3), or positive-negative (FIG. 4) Galilean lens is preferable than a positive-positive (FIG. 2) Keplerian lens. In Galilean lenses, since the distance between the third subunit (Gr3) and the fourth subunit (Gr4) produces different absolute values of each focal length (f3, f4), the moving lens unit (GrR) can be made more compact and light weight, and the conjugate distance of the moving lens unit (GrR) can be reduced compared to Keplerian lenses wherein the lens unit spacing is the sum of each focal length (f3, f4). The telecentric optical system shown in FIG. 5 uses the Galilean (negative-positive) moving lens unit (GrR) shown in FIG. 3, whereas the telecentric optical system shown in FIG. 6 uses the Keplerian (positive-positive) moving lens unit (GrR) shown in FIG. 2. It can be understood from a comparison of these two types of telecentric optical systems that Although the negative-positive Galilean moving lens unit (GrR) shown in FIG. 3 is used in the telecentric optical system shown in FIG. 5, it should be clear from the foregoing discussion that the positive-negative Galilean moving lens unit (GrR) shown in FIG. 4 also may be used. That is, the moving lens unit (GrR) desirably comprises a third subunit (Gr3) having either positive or negative optical power, and a fourth subunit (Gr4) having the opposite optical power of the third subunit (Gr3). The optical power arrangement of the subunits (Gr3 and Gr4) of the moving lens unit (GrR) may be either positive-negative or negative-positive, and is determined by whether the magnification of the moving lens unit (GrR) is enlargement magnification or reduction magnification.

To produce the telecentric optical system shown in FIG. 5, the amount of back change Δd2 (FIG. 1) of the fixed lens unit (GrF) when the object (OB) moves only Δd1 (FIG. 1) may match the amount of conjugate distance change ΔA3 (FIG. 3) of the moving lens unit (GrR) when the moving lens unit (GrR) moves only an amount D. Accordingly, equation (E7) expressing Δd2=Δd3 is obtained from equations (E1) and (E6') which is a modification of equation (E6), and equation (E7') expressing the amount of movement D is derived by modifying the equation (E7).

$$\Delta d2=\beta F^2\times\Delta d1 \tag{E1}$$

$$\Delta d3=\{(1-\beta R^2)/\beta R^2\}\times D \tag{E6'}$$

$$\beta F^2\times\Delta d1=\{(1-\beta R^2)/\beta R^2\}D \tag{E7}$$

$$D=\{\beta R^2/(1-\beta R^2)\}\times\beta F^2\times\Delta d1 \tag{E7'}$$

In the telecentric optical system shown in FIG. 5, when ΔOWD represents the change in the conjugate distance, the equation (E7") below is obtained by substituting Δd1 from equation (E7') for ΔOWD. When β represents the magnification of the overall telecentric optical system, equation (E9) is obtained from equation (E7') since equation (E8) is established.

$$D=\{\beta R^2/(1-\beta R^2)\}\times\beta F^2\times\Delta OWD \tag{E7"}$$

$$\beta=\beta F\times\beta R \tag{E8}$$

$$D/\Delta OWD=\beta^2/(1-\beta R^2) \tag{E9}$$

According to the relationship of equation (E9), when ΔOWD increases as the conjugate distance decreases, the moving lens unit (GrR) moves from the object (OB) side to the image (IM) side since D>0 if |βR|<1, and the moving lens unit (GrR) moves from the image (IM) side to the object (OB) side since D<0 if |βR|>1. In this way, focusing is accomplished by detecting the object (OB) position while dual telecentric characteristics on the object side and image side are normally maintained by moving only a single small lens unit (GrR) even when the conjugate distance changes. Furthermore, the moving lens unit (GrR) can be made more compact and light weight, and the system can be constructed by a simple device since only a single moving lens unit (GrR) is used. Accordingly, this telecentric optical system (OP) can be used to change the conjugate distance at high speed and high precision, and the working distance and back focal length need not be fixed.

In the aforesaid telecentric optical system, it is desirable that conditional equation (ii) below is satisfied.

$$10^2\leq H\beta^2\cdot|d\cdot(\beta R^2-1)|\leq 10^6 \tag{ii}$$

Where β represents the total system magnification, βR represents the magnification of the moving lens unit (GrR), H represents the range of focusable object (OB) positions, and d represents the movement detection pitch of the moving lens unit (GrR).

Figure 7:
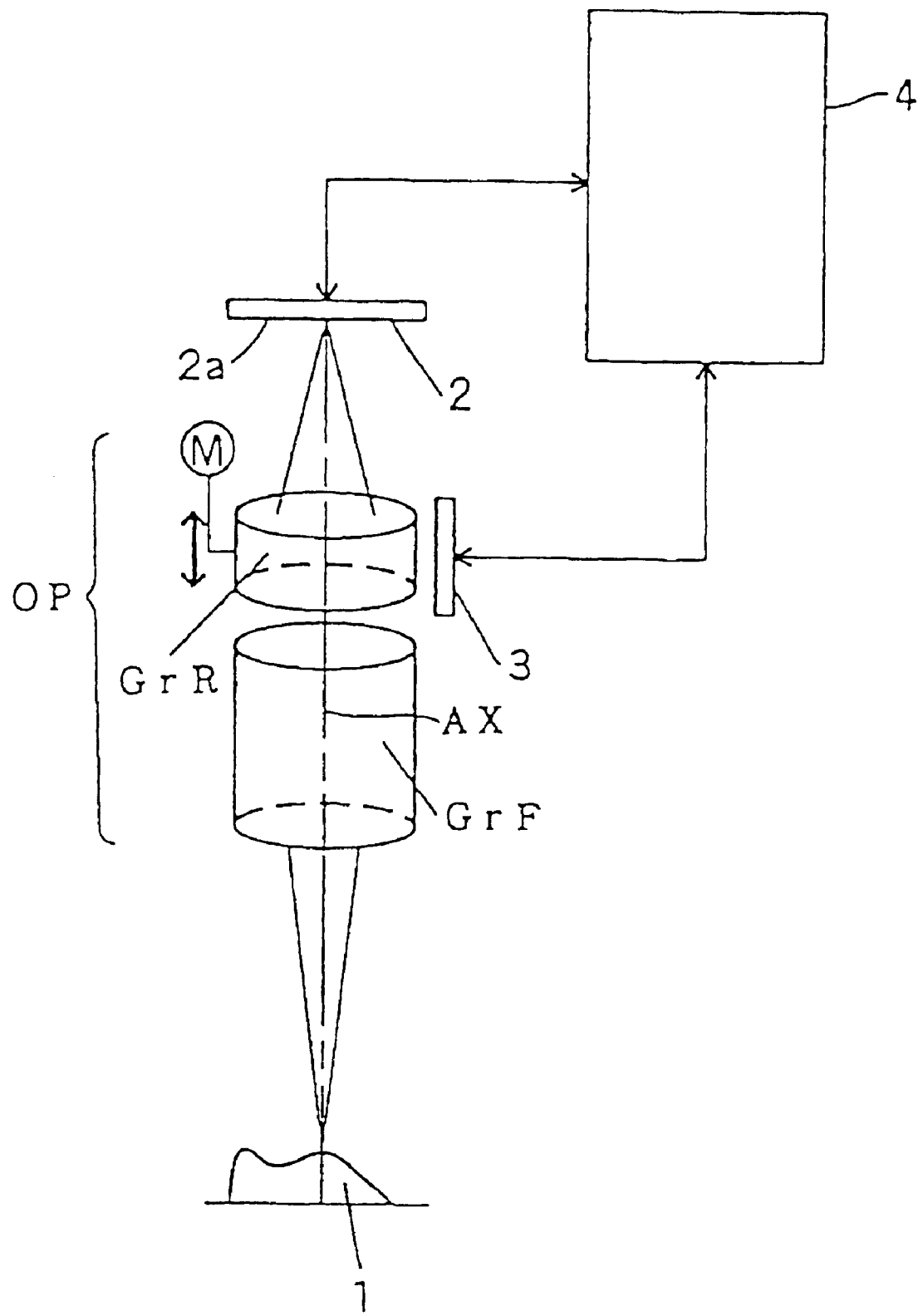
FIG. 7 briefly shows the structure of a three-dimensional shape measuring device using a method utilizing extra-system illumination light.

The three-dimensional shape of an object (OB) can be measured using the aforesaid telecentric optical system. Stipulating the conditions of conditional equation (ii) is desirable for such measurement, and the three-dimensional shape measuring device shown in FIG. 7 is an embodiment for accomplishing such measurement. The three-dimensional shape measuring device shown in FIG. 7 comprises the previously described telecentric optical system (OP), a two-dimensional sensor (2), a moving means (M), a linear scale (3), and a controller (4). This measuring device is capable of measuring the three-dimensional shape of a measurement target (1) which is a solid object. Since the construction does not have an illumination means, the measurement target (1) is illuminated by light from outside the system.

The telecentric optical system (OP) is an optical system for forming an image of a measurement target (1), and comprises the previously described fixed lens unit (GrF) and moving lens unit (GrR). When measuring an object height (i.e., the object dimension in a direction parallel to the optical axis (AX)) at single points using only axial light, only the axial optical characteristics need satisfy specifications, such that the telecentric optical system (OP) is not required as the optical system. However, when measuring the height of a plurality of points on the measurement target (1) at one time using extra-axial light, optical characteristics must be added to satisfy specifications at the used image height, and a telecentric optical system is required on both the object side and the image side. If the telecentric optical system (OP) is used on both the object side and the image side, a constant projection magnification can be maintained when measuring points of different height off-axis, and constant measurement resolution can be maintained within a plane perpendicular to the optical axis (AX). Therefore, the surface shape of a measurement target (1) having different object distances can be measured with high accuracy. Furthermore, since only the moving lens unit (GrR) moves, the moving components comprising the moving means (M) can be made compact and light weight, resulting in a high speed measurement capability.

The two-dimensional sensor (2) is a, area charge-coupled device (CCD) provided with a photoreceptive surface (2a) comprising a plurality of photoreceptor elements, and is fixed in position so that the image of the measurement target (1) is projected on the photoreceptive surface (2a). The moving means (M) is a means for moving the moving lens unit (GrR) along the optical axis (AX), and scanning for detecting the object height is accomplished by moving the moving lens unit (GrR) along the optical axis (AX) via the moving means (M). The moving means (M) comprises a drive device such as a motor or the like, and a drive force transmission mechanism, and if a mechanism is provided for moving the moving lens unit (GrR) along the optical axis (AX), such movement may be accomplished by manual operation or the drive may be controlled by the controller (4). The linear scale (3) is a detection means for detecting the movement D of the moving lens unit (GrR) by detecting the position of the moving lens unit (GrR). The calculation of the movement D detected by the linear scale (3), and the CCD drive of the two-dimensional sensor (2) are accomplished by the controller (4).

In the measurement of the three-dimensional shape of the measurement target (1), the three-dimensional dimensions within a plane perpendicular to the optical axis (AX) are determined from the dimensions of the image projected on the photoreceptive surface (2a) of the two-dimensional sensor (2) via the telecentric optical system (OP). On the other hand, the three-dimensional object dimension (height) in a direction parallel to the optical axis (AX) is determined by reading the change in output from each photoreceptor element of the two-dimensional sensor (2) as the moving lens unit (GrR) is moved along the optical axis (AX) by the moving means (M), and detecting the position (i.e., amount of movement D) of the moving lens unit (GrR) via the linear scale (3) when the measurement target (1) is focused on the photoreceptive surface (2a) (i.e., when the output attains a peak via the establishment of a conjugate relationship between the measurement target (1) and the photoreceptive surface (2a)). Accordingly, the height information of the measurement target (2a) is obtained in correspondence with the surface area of the photoreceptive surface (2a) of the two-dimensional sensor (2) via only a single movement of the moving lens unit (GrR). For example, when the length of the photoreceptive surface (2a) of the two-dimensional sensor (2) is represented by the symbol a, the length of the bottom of the measurable measurement target (1) is $a/\beta$, and the height is the amount of change $\Delta$OWD in the conjugate distance.

When H represents the height of the measurement object (1) (i.e., the range of the focusable object (OB) position), h represents the resolution in the height direction desired, and d represents the position detection accuracy (i.e., the movement detection pitch) of the moving lens unit (GrR), equation (E10) is obtained from the equation (E9) since H=$\Delta$OWD.

$$D/H = d/h = \beta^2/|1-\beta R^2| \tag{E10}$$

The relationships among D, d, H, and h in equation (10) are defined in equation (11) below. When considering the total movement D of the moving lens unit (GrR) and the position detection accuracy d of the moving lens unit (GrR), n equals the number of divisions of the linear scale (3) used for position detection. The minimum resolution of a typical linear scale (3) is 0.1 $\mu$m or greater, and the total length is less than 100 mm. A linear scale (3) having a smaller resolution range is expensive. When a linear scale (3) which is longer than this range is used, the movement D of the moving lens unit (GrR) increases and the moving means (M) becomes excessively large so as to be impractical. Accordingly, it is desirable that conditional equation (iii) is satisfied.

$$n = D/d = H/h \tag{E11}$$

$$n = D/d \leq 10^2 \tag{iii}$$

When considering the height H of the measurement target (1) and the measurement resolution, it is desirable the conditional equation (iv) below is satisfied. The three-dimensional shape measurement device of n<102, can be realized by a simpler device than the system using the aforesaid telecentric optical system (OP), and is inappropriate for the use of this telecentric optical system (OP).

$$n = H/h \geq 10^2 \tag{iv}$$

From conditional equations (iii) and (iv), when a telecentric optical system (OP) is used for the purpose of dimension measurement, it is desirable that the value of n used is in the range satisfying conditional equation (v) below.

$$10^2 \leq n \leq 10^6 \tag{v}$$

Equation (E10') is obtained by modifying equation (E10), and equation (E11') is obtained by modifying equation (E11). Equation (E12) below is derived from equations (E10') and (E11').

$$H/D = |1-\beta R^2|/\beta^2 \tag{E10'}$$

$$h = (d/D) \times H \tag{E11'}$$

$$h = \{|1-\beta R^2|/\beta^2\} \times d \tag{E12}$$

Equation (E13) below is derived from equations (E11) and (E12). If conditional equation (v) is satisfied using equation (E13), the aforesaid conditional equation (ii) is obtained. That is, when using a telecentric optical system (OP) to measure the dimensions of a measurement target (1), it is desirable that the magnifications $\beta$ and $\beta R$ satisfy conditional equation (ii). A specific system construction, for example, may have the values shown in Table 1 below.

$$n = H/h$$

$$= H \cdot \beta^2 / \cdot (d \cdot 1 - \beta R^2|)$$

$$= H \cdot \beta^2 / d \cdot (\beta R^2 - 1) \tag{E11}$$

$$10^2 \leq H \cdot \beta^2 / |d \cdot (\beta R^2 - 1)| \leq 10^6 \tag{ii}$$

TABLE 1

| H(mm) | h($\mu$ m) | D(mm) | d($\mu$ m) | N |
|---|---|---|---|---|
| 1 | 10 | 10 | 100 | 100 |
| 100 | 1 | 20 | 0.2 | 100000 |

If a confocal detection method is used in a three-dimensional shape measuring device, more accurate height measurement can be obtained than the previously described three-dimensional shape measuring device (FIG. 7). Although confocal detection methods include point methods and slit methods, the slit method of measuring height information at multiple points simultaneously attains higher speed measurement compared to the pin-hole method. The slit confocal detection method is used in the scanning-type detection device disclosed in Japanese Laid-Open Utility Model No. 5-75607. However, since the complete optical system is constructed to move along the optical axis, the moving members unavoidably must be made larger. The three-dimensional shape measuring device shown in FIG. 8 uses the slit confocal detection method, and achieves compact and light weight moving members by using the previously described telecentric optical system (OP).

Figure 8:
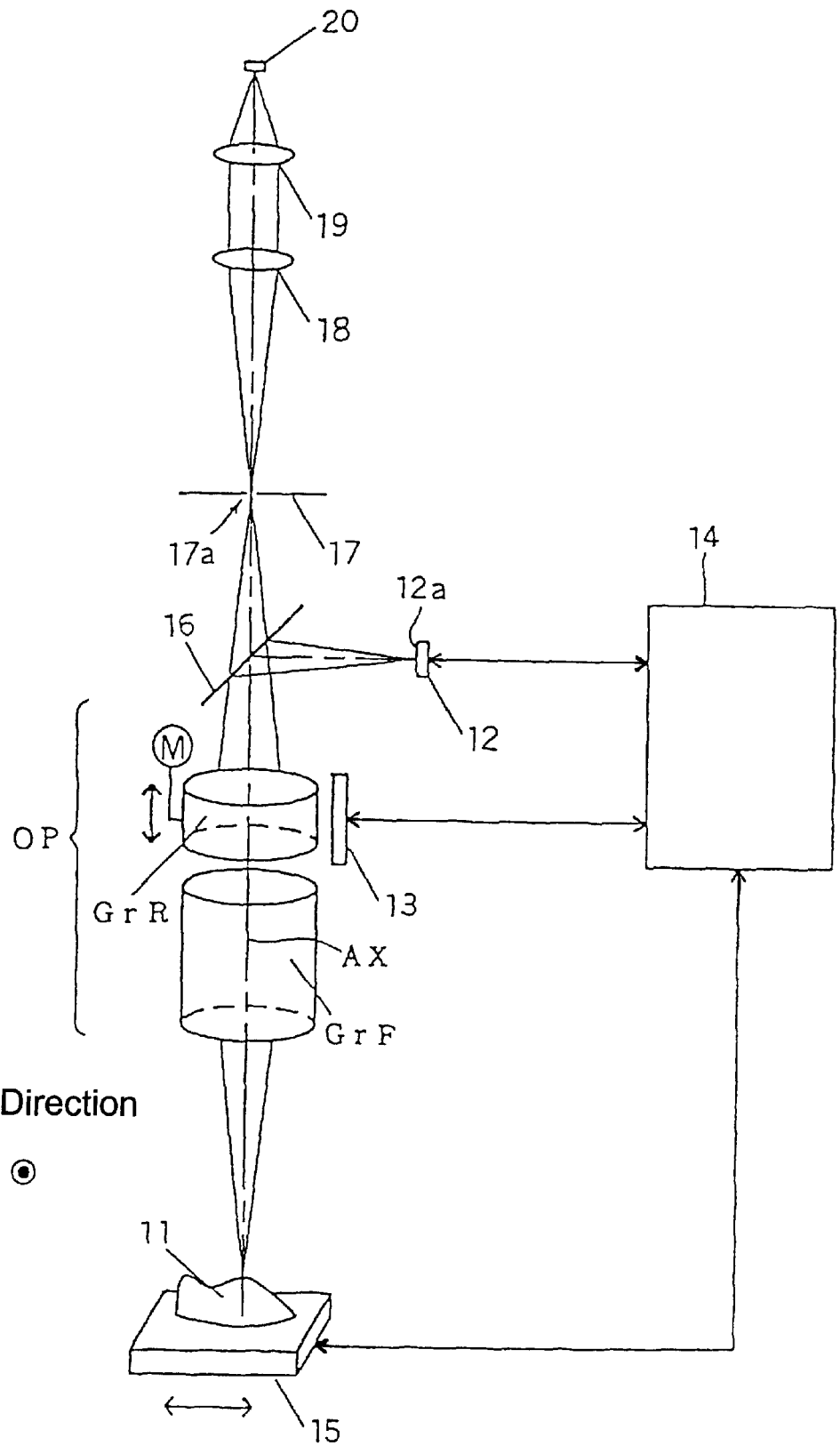
FIG. 8 briefly shows the structure of a three-dimensional shape measuring device using a slit confocal detection method.

The three-dimensional shape measuring device shown in FIG. 8 comprises the previously described telecentric optical system (OP), unidimensional sensor (12), moving means (M), linear scale (13), controller (14), scan stage (15), beam splitter (16), slit member (17), cylindrical lens (18), collimator lens (19), and light source (20). This measuring device is capable of measuring a three-dimensional shape of a measurement target (1) which is a solid body. The telecentric optical system (OP) and the moving means (M) are identical in construction to the device previously described, the linear scale (13) is also identical to the scale previously described and is an example of a detecting means for detecting the amount of movement of the moving lens unit (GrR).

The illumination light emitted from a point light source (20) passes through the collimator lens (19) and cylindrical lens (18) to linearly form an image. A slit member (17) is arranged so as to position the slit at the image forming position (the slit direction in FIG. 8 is perpendicular to the paper surface). Accordingly, the light emitted from the slit (17a) is slit-like illumination light. This illumination light passes through the beam splitter (16), and thereafter enters the telecentric optical system (OP). The telecentric optical system (OP) forms an image of the measurement target (11) by illuminating the measurement target (11) via the slit-like illumination light emitted from the slit (17a), and passing the light reflected from the measurement target (11) through the system to form the image.

The reflected light passing through the telecentric optical system (OP) is reflected by the beam splitter (16), and enters the photoreceptive surface (12a) of the unidimensional sensor (12). The unidimensional sensor (12) comprises a line CCD, the photoreceptive surface (12a) formed of a plurality of photoreceptor elements has a conjugate position of the slit (17a), and is fixedly disposed so as to project the image of the measurement target (11) on the photoreceptive surface (12a). That is, the slit (17a) and the photoreceptive surface (12a) both are disposed in a conjugate positional relationship relative to the measurement target (11) (i.e., positioned at optically equivalent positions in the telecentric optical system (OP)).

The scanning stage (15) is a scanning means which moves in a direction perpendicular to the slit (17a) and the optical axis (AX) together with a loaded measurement target (11). That is, the scanning stage (15) is a scanning means for scanning a measurement target (11) by changing the relative positions of the measurement target (11) and the illumination light relative to the measurement target (11) in a direction perpendicular to the slit (17a) and the optical axis (AX). Alternatively, the optical system from the light source (20) to the telecentric optical system (OP) may be moved relative to the measurement target (11) rather than moving the measurement target (11) with the scanning stage (15). Furthermore, the construction may use deflection scanning of the slit-like illumination light in a direction perpendicular to the slit (17a) and optical axis (AX) using a deflection device such as a galvano mirror, polygonal mirror or the like. Control of the scanning stage (15), calculation of the amount of movement D detected by the linear scale (13), and the CCD drive time of the unidimensional sensor (12) is accomplished via controller (14).

In measuring the three-dimensional shape of the measurement target (11), the three-dimensional dimensions in the slit (17a) direction is determined from the dimensions of the image projected on the photoreceptive surface (12a) by the telecentric optical system (OP), and the three-dimensional dimensions in a direction perpendicular to the slit (17a) and optical axis (AX) are determined via the moving scan of the measurement target (11) by the scanning stage (15). On the other hand, the cross-section dimensions (height) of the three-dimensional object in a direction parallel to the optical axis (AX) is determined by detecting the position (i.e., amount of movement D) of the moving lens unit (GrR) via the linear scale (13) when measurement target (11) is focused on the photoreceptive surface (12a) by reading the change in output from the photoreceptor elements of the unidimensional sensor (12) as the moving lens unit (GrR) is moved along the optical axis (AX) via the moving means (M) (i.e., when the output peaks via the establishment of a conjugate position of the measurement target (11) and the photoreceptive surface (12a). Accordingly, when the moving lens unit (GrR) is moved by the moving means (M) as the measurement target (11) is moved by the scanning stage (15), the cross-sectional shape of the measurement target (11) is sequentially detected, and the three-dimensional shape of the measurement target (11) is measured by calculations performed by the controller (14).

Among the pin-hole methods, in addition to the previously described single pin-hole type for obtaining height information of a single point at a time, there is also a multi pin-hole type for obtaining height information of a plurality of pin-holes at a time. The multi pin-hole confocal detection method is used in a three-dimensional shape measuring device disclosed in Japanese Laid-Open Patent Application No. 9-126739, which is capable of measuring multi point height information with high accuracy. However, the height resolution is dependent on the thickness pitch of a parallel-plate glass because the construction focuses relative to different object heights by inserting parallel-plate glass of different thickness between the measurement target ad the objective lens. Accordingly, continuous height information cannot be obtained. The three-dimensional shape measuring device shown in FIG. 9 uses the multi pin-hole confocal detection method as well as the previously described telecentric optical system (OP) to obtain continuous height information.

Figure 9:
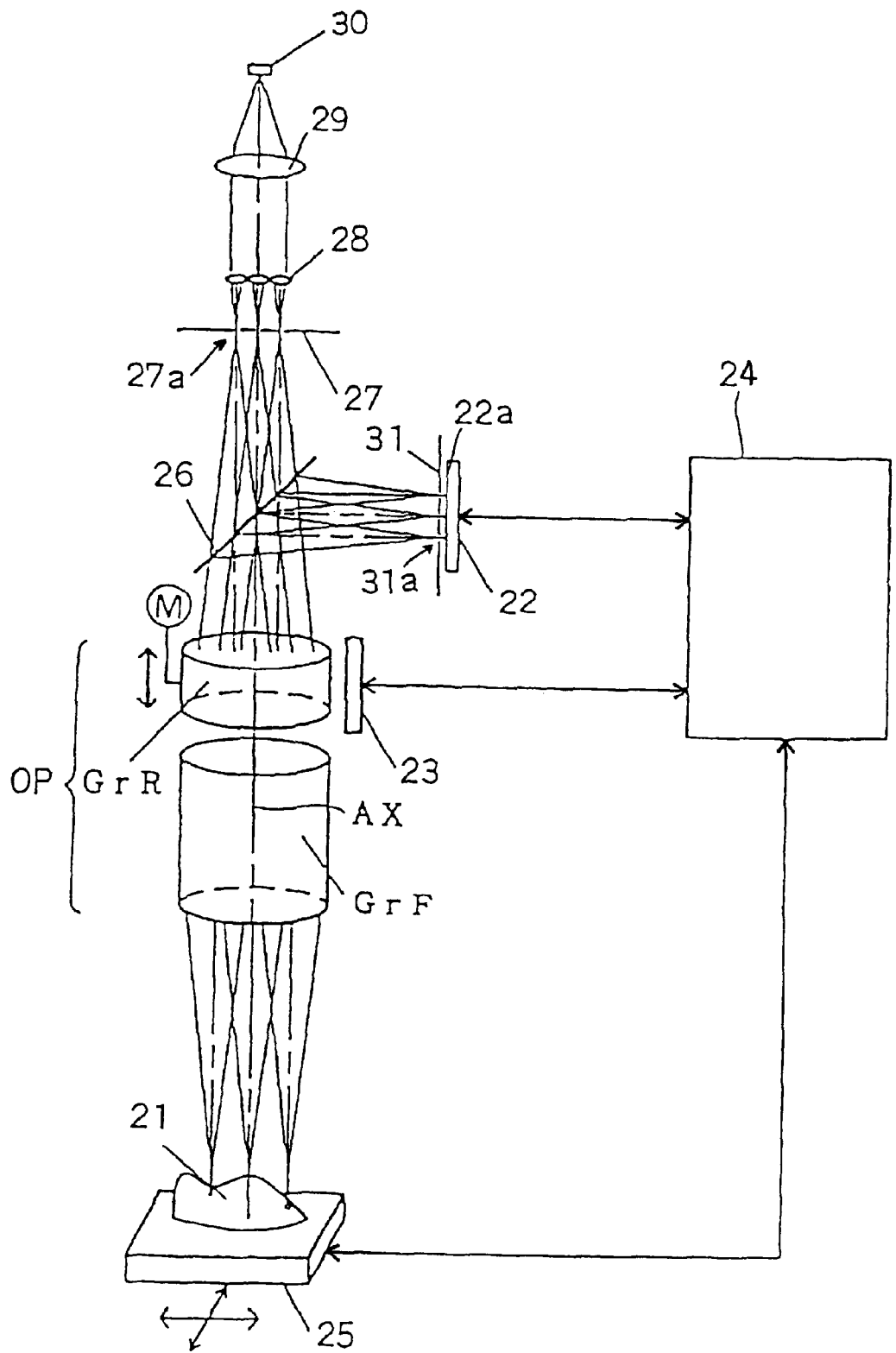
FIG. 9 briefly shows the structure of a three-dimensional shape measuring device using a multi pin-hole confocal detection method.

The three-dimensional shape measuring device shown in FIG. 9 comprises the previously described telecentric optical system (OP), two-dimensional sensor (22), moving means (M), linear scale (23), controller (24), scanning stage (25), beam splitter (26), first multi pin-hole member (27), multi lens array (28), collimator lens (29), light source (30), and second multi pin-hole member (31). This three-dimensional shape measuring device is capable of measuring a three-dimensional shape of a measurement target (21) which is a solid object. The telecentric optical system (OP) and the moving means (M) are identical in construction to the device previously described, the linear scale (23) is also identical to the linear scales (3, 13) previously described and is an example of a detecting means for detecting the amount of movement of the moving lens unit (GrR).

The illumination light emitted from a point light source (30) passes through the collimator lens (29) and cylindrical lens (28) to form an image, and becomes multi point light sources arrayed two-dimensionally. A first multi pin-hole member (27) is arranged so as to position the pin holes at each image forming position. Accordingly, the light emitted from the multi pin holes (27a) is multi spot illumination light. The illumination light emitted from the multi pin holes (27a) passes through the beam splitter (26), and thereafter enters the telecentric optical system (OP). The telecentric optical system (OP) forms an image of the measurement target (21) by illuminating the measurement target (21) via the illumination light (multi spot) emitted from the pin holes (27a), and passing the light reflected from the measurement target (21) through the system to form the image.

The reflected light passing through the telecentric optical system (OP) is reflected by the beam splitter (26), passes through the pin holes (31a) of the second multi pin-hole member (31), and subsequently enters the photoreceptive surface (22a) of the two-dimensional sensor (22). The second multi pin-hole member (31) is provided with pin holes (31a) at conjugate positions to the pin holes (27a) of the first multi pin-hole member (27). That is, the pinholes (27a) of the first multi pin-hole member (27) and the pin holes (31a) of the second multi pin-hole member (31) are disposed in a conjugate relationship relative to the measurement target (21) (i.e., at optically equivalent positions in the telecentric optical system (OP)). The two-dimensional sensor (22) comprises an area CCD having a photoreceptive surface (22a) formed of a plurality of photoreceptor elements near the second multi pin-hole member (31), and is fixedly disposed so as to project the image of the measurement target (21) on the photoreceptive surface (22a) via the light passing through the pin holes (31a) of the second multi pin-hole member (31).

The scanning stage (25) is a scanning means which moves in two directions perpendicular to the optical axis (AX) together with a loaded measurement target (21). That is, the scanning stage (25) is a scanning means for scanning a measurement target (21) by changing the relative positions of the measurement target (21) and the illumination light relative to the measurement target (21) within a plane perpendicular to the optical axis (AX). Since the image formed on the photoreceptive surface (22a) corresponds to the multi spots of illumination light relative to the measurement target (21), the movement of the scanning stage (25) is accomplished at a pitch smaller than the pin holes (27a, 31a). Alternatively, the optical system from the light source (30) to the telecentric optical system (OP) may be moved relative to the measurement target (21) rather than moving the measurement target (21) with the scanning stage (25). Furthermore, the construction may use deflection scanning of the multi spot illumination light within a plane perpendicular to the optical axis (AX) using a deflection device such as a galvano mirror, polygonal mirror or the like. Control of the scanning stage (25), calculation of the amount of movement D detected by the linear scale (23), and the CCD drive time of the two-dimensional sensor (22) is accomplished via controller (24).

In measuring the three-dimensional shape of the measurement target (21), the three-dimensional dimensions in the plane perpendicular to the optical axis (AX) is determined by the moving scan of the measurement target (21) via the scanning stage (25). On the other hand, the three-dimensional object dimensions (height) in a direction parallel to the optical axis (AX) is determined by detecting the position (i.e., amount of movement D) of the moving lens unit (GrR) via the linear scale (23) when measurement target (21) is focused on the photoreceptive surface (22a) at the pin hole plane of the second multi pin-hole member (31) by reading the change in output from the photoreceptor elements of the two-dimensional sensor (22) corresponding to the pin hole (31a) of the second multi pin-hole member (31) as the moving lens unit (GrR) is moved along the optical axis (AX) via the moving means (M) (i.e., when the output peaks via the establishment of a conjugate position of the measurement target (21) and the pin hole plane of the second multi pin-hole member (31)). Accordingly, when the moving lens unit (GrR) is moved by the moving means (M) as the measurement target (21) is moved by the scanning stage (25), the height of the measurement target (21) is sequentially detected at a plurality of pin holes, and the three-dimensional shape of the measurement target (21) is measured by calculations performed by the controller (24).

The telecentric optical system of the previously described embodiments is capable of focusing while normally maintaining telecentric characteristics on both the object side and the image side by moving a single small lens unit even when the conjugate distance changes. The moving lens unit is smaller, and the system is constructed by a simple device since only a single moving lens unit is used, and therefore can be used to change the conjugate distance at high speed with high accuracy, and may be used even when the working distance and back focal length are not fixed. Accordingly, the three-dimensional shape of a measurement target can be measured at high speed with high precision via a three-dimensional shape measuring device utilizing this telecentric optical system.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A bilaterally conjugate telecentric optical system comprising sequentially from one conjugate side:

a first lens unit in the form of an afocal optical system including sequentially from one conjugate side a first subunit having positive optical power and a second subunit having positive optical power, and having an aperture stop fixed in the optical axis direction at the focal position on the back side of the first subunit; and a second lens unit in the form of an afocal optical system that is movable in the optical axis direction to adjust the focus while maintaining a telecentric state.

2. The optical system of claim 1, wherein the second afocal lens unit comprises a third subunit and a fourth subunit both having positive optical power.

3. The optical system of claim 1, wherein the second afocal lens unit comprises a third subunit and a fourth subunit both having optical power of mutually different sign.

4. The optical system of claim 1, wherein the second afocal lens unit comprises a third subunit and a fourth subunit both having optical power of mutually different sign, and the third and fourth subunits satisfy the conditions below;

$$f3 \neq -f4$$

where f3 represents the focal length of the third subunit, and f4 represents the focal length of the fourth subunit.

5. The optical system of claim 4, wherein the third subunit has positive optical power, and the fourth subunit has negative optical power.

6. The optical system of claim 4, wherein the third subunit has negative optical power, and the fourth subunit has positive optical power.

7. A shape measuring device comprising:
an optical system which is bilaterally conjugate and telecentric comprising sequentially from one conjugate side:
- a first lens unit in the form of an afocal optical system including sequentially from one conjugate side a first subunit having positive optical power and a second subunit having positive optical power, and having an aperture stop fixed in the optical axis direction at the focal position on the back side of the first subunit; and
- a second lens unit in the form of an afocal optical system that is movable in the optical axis direction to adjust the focus while maintaining a telecentric state;

a photoreception means disposed at one or another conjugate position in the optical system for converting an image projected by an optical system having a plurality of photoreceptors to image signals;
a moving means for moving the second lens unit along the optical axis of the optical system; and
a calculation means for calculating the shape in the optical axis direction of a measurement target disposed on the opposite conjugate side to the photoreception means by detecting the focus state based on the image signals converted by the photoreception means.

8. The shape measuring device of claim 7, wherein the optical system comprises sequentially from the measurement target side, a first lens unit and a second lens unit.

9. A shape measuring device comprising:
a light source for emitting illumination light;
a slit member having a slit for emitting the illumination light from the light source as slit-like illumination light;
a stage member for supporting a measurement target;
an optical system which is bilaterally conjugate and telecentric, disposed so as to transmit illumination light from a slit member to illuminate a measurement target placed on a stage, and transmit the light reflected from the measurement target to form an image of the measurement target at the conjugate position of the slit of the slit member, and comprising sequentially from one conjugate side:
- a first lens unit in the form of an afocal optical system including sequentially from one conjugate side a first subunit having positive optical power and a second subunit having positive optical power, and having an aperture stop fixed in the optical axis direction at the focal position on the back side of the first subunit; and
- a second lens unit in the form of an afocal optical system that is movable in the optical axis direction to adjust the focus while maintaining a telecentric state;

a separation means for separating the illumination light and the image light to separate the slit position and the conjugate position;
a photoreception means having a photoreceptive surface disposed at a conjugate position and formed of a plurality of photoreceptive elements for converting an image of a measurement target formed on the photoreceptive surface to image signals;
a moving means for moving the second lens unit along the optical axis of the optical system; and
a calculation means for calculating the shape of a measurement target disposed on a stage in the optical axis direction corresponding to the slit illumination light by detecting the focus state based on the image signals converted by the photoreception means.

10. The shape measuring device of claim 9, wherein the optical system comprises sequentially from the measurement target side:
a first lens unit and a second lens unit.

11. The shape measuring device of claim 9, further comprising:
a scanning means for moving at least one or another of the stage member and optical system within a plane perpendicular to the optical axis of the optical system to change the mutually relative positions.

12. The shape measuring device of claim 9, wherein the photoreception means is a unidimensional sensor extending in a direction corresponding to the image light.

13. A shape measuring device comprising:
a light source for emitting illumination light;
a first multi pinhole member having a plurality of pinholes for emitting through the pinholes the illumination light emitted from the light source;
a stage member for supporting a measurement target;
an optical system which is bilaterally conjugate and telecentric, disposed so as to transmit illumination light from a first multi pinhole member to illuminate a measurement target placed on a stage, and transmit the light reflected from the measurement target to form an image of the measurement target at the conjugate position of the first multi pinhole member, and comprising sequentially from one conjugate side:
- a first lens unit in the form of an afocal optical system including sequentially from one conjugate side a first subunit having positive optical power and a second subunit having positive optical power, and having an aperture stop fixed in the optical axis direction at the focal position on the back side of the first subunit; and
- a second lens unit in the form of an afocal optical system that is movable in the optical axis direction to adjust the focus while maintaining a telecentric state;

a separation means for separating the illumination light and the image light to separate the first multi pinhole position and the conjugate position;
a second multi pinhole member having a plurality of pinholes and disposed at a conjugate position;
a photoreception means having a photoreceptive surface formed of a plurality of photoreceptor elements and on the image side of the second multi pinhole member for converting an image of a measurement target formed on the photoreceptive surface to image signals via the second multi pinhole member;
a moving means for moving the second lens unit along the optical axis of the optical system; and
a calculation means for calculating the shape of a measurement target disposed on a stage in the optical axis direction corresponding to the slit illumination light by detecting the focus state based on the image signals converted by the photoreception means.

14. The shape measuring device of claim 13, wherein the optical system comprises sequentially from the measurement target side, a first lens unit and a second lens unit.

15. The shape measuring device of claim 13, further comprising:
a scanning means for moving at least one or another of the stage member and optical system within a plane perpendicular to the optical axis of the optical system to change the mutually relative positions.

\* \* \* \* \*